(12) United States Patent
Raichle et al.

(10) Patent No.: US 6,397,669 B1
(45) Date of Patent: Jun. 4, 2002

(54) METHOD AND ARRANGEMENT FOR EVALUATING COMBUSTION PROCESSES IN AN INTERNAL COMBUSTION ENGINE

(75) Inventors: Franz Raichle, Korntal-Münchingen; Juergen Foerster, Ingersheim; Johann Boehme, Witten; Michael Wagner, Gelsenkirchen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,573
(22) PCT Filed: Jul. 30, 1999
(86) PCT No.: PCT/DE99/02348
  § 371 (c)(1),
  (2), (4) Date: Aug. 2, 2000
(87) PCT Pub. No.: WO00/20833
  PCT Pub. Date: Apr. 13, 2000

(30) Foreign Application Priority Data

Oct. 1, 1998 (DE) .......................................... 198 45 232

(51) Int. Cl.$^7$ ............................................. G01M 15/00
(52) U.S. Cl. ..................... 73/117.3; 73/35.09; 73/35.12
(58) Field of Search ........................... 73/35.01, 35.03, 73/35.04, 35.06, 35.07, 35.09, 35.11, 35.12, 35.13, 116, 117.2, 117.3

(56) References Cited

U.S. PATENT DOCUMENTS

| 5,005,549 | A |   | 4/1991 | Pernpeintner et al. |
| 5,119,783 | A |   | 6/1992 | Komurasaki |
| 5,379,634 | A | * | 1/1995 | Kuroda et al. ................. 73/116 |
| 5,400,648 | A |   | 3/1995 | Mahr |
| 5,747,679 | A | * | 5/1998 | Dietz et al. .................... 73/116 |
| 5,774,823 | A | * | 6/1998 | James et al. ................... 73/116 |
| 6,188,952 | B1 | * | 2/2001 | Serra et al. .................... 73/115 |

FOREIGN PATENT DOCUMENTS

| DE | 35 05 210 | 8/1986 |
| DE | 196 12 180 | 3/1997 |

* cited by examiner

*Primary Examiner*—Eric S. McCall
(74) *Attorney, Agent, or Firm*—Walter Ottesen

(57) ABSTRACT

A method and an arrangement for evaluating the combustion operations in an internal combustion engine with a model is suggested. The model takes a time-dependent transfer between pressure and structure-borne noise as a basis for the relevant low frequency oscillations and only individual components of the reconstructable pressure signal are used for the determination of combustion-relevant parameters and conditions. Independence of engine speed is achieved with the realization of the time dependency with an angular-dependent transfer function.

11 Claims, 2 Drawing Sheets

METHOD AND ARRANGEMENT FOR EVALUATING COMBUSTION PROCESSES IN AN INTERNAL COMBUSTION ENGINE

FIELD OF THE INVENTION

Various methods exist for the evaluation of combustion processes.

BACKGROUND OF THE INVENTION

A plurality of motoric characteristic variables and conditions can be detected on the basis of combustion chamber pressure transducers. Motoric characteristic variables and conditions include, for example, actual load, misfires, combustion position, et cetera. This method requires an additional bore per cylinder in the cylinder head as well as a transducer which is adequate for series manufacture. These disadvantages as well as the high system costs presently hinder a use in series production.

The rough-running method is presently used for the detection of combustion misfires. For high-cylinder engines, the disturbance spacing is problematic with small loads.

In order to determine individual combustion-related parameters and conditions, it has overall been shown that a plurality of additional sensors and methods are applied when there is no combustion chamber pressure signal.

SUMMARY OF THE INVENTION

From the literature, it is known that the pressure information is transferred into the structure-borne noise in a complicated manner. No methods are known which make possible a complete reconstruction of the pressure signal from the structure-borne noise under practice-relevant conditions.

In U.S. Pat. 5,119,783, a method and an arrangement for determining the trace of the internal pressure of a cylinder of a piston engine is introduced. Here, a transfer function of the structure-borne noise is identified in the cylinder internal pressure. Thereafter, the computation of the cylinder of the cylinder pressure takes place by applying the previously identified transfer function to the measured structure-borne noise signal. Utilizing gate signals, only signal sections of the presure signal is reconstructed. The evaluation of the internal pressure trace over the entire work cycle is not provided. The transfer function is not dependent upon time or crankshaft angle within the signal window pregiven by the gate circuit.

In DE 196 12 180 C1, a method for detecting irregular combustion noises on a multi-cylinder diesel engine is introduced. Here, the combustion noise is used for feature extraction by means of structure-borne noise transducers. It can be assumed that even higher frequency signal components are applied. This method cannot be applied to spark-ignition engines since the higher frequency signals, which are generated in the structure-borne noise by normal combustions, can hardly be distinguished from disturbance noises.

In U.S. Pat. 5,005,549, a method for determining defective combustions is derived from the known principle of knock detection from structure-borne noise. For this purpose, the structure-borne noise signal is evaluated in an additional measurement window between the ignition time point and the actual knock window at idle. No information is obtained as to the frequency range which permits the detection of defective combustions.

An open-loop control and a closed-loop control of the combustion in the combustion chamber of an internal combustion engine is known from U.S. patent application Ser. No. 09/508,070, filed on Aug. 24, 1998. This open-loop control and closed-loop control is based on the reconstruction of the combustion pressure trace from signals of the knock sensors.

In U.S. Pat. 5,400,648, a method and an arrangement for determining the trace of the internal pressure of a cylinder of a piston engine is introduced. Here, a transfer function of the structure-borne noise is identified in the cylinder internal pressure. Thereafter, the computation of the cylinder pressure takes place by applying the previously identified transfer function to the measured structure-borne noise signal. Utilizing gate signals, only signal sections of the pressure signal are reconstructed. The evaluation of the internal pressure trace over the entire work cycle is not provided. The transfer function is not dependent upon time or crankshaft angle within the signal window pregiven by the gate circuit.

The limitation to specific signal segments is justified with the suppression of noise components in U.S. Pat. 5,400,648. However, this limitation leads beyond this suppression to the loss of useful data. The pressure signals of all cylinders are imaged in a crankshaft angular range of 720°KW in four-stroke engines. For this reason, an increasing overlapping of the pressure signals of different cylinders takes place with an increasing number of cylinders. The signal windows become correspondingly narrower in which the signal of a cylinder remains uninfluenced from the in-coupling of other cylinders.

The application of this method for detecting all features extractable from the cylinder internal pressure is therefore not possible for multi-cylinder engines.

The object of the invention is the development of a method and an arrangement wherein only the combustion-relevant parameters and conditions are extracted from the structure-borne noise signal.

Examples of combustion-relevant parameters are the integral of the combustion increase in the pressure signal, the integral of the pressure signal in the increase phase before reaching the maximum and the position of the maximum of the pressure signal. The pressure signal includes a component which is only attributable to the compression. This component could be measured, for example, without ignition. The pressure correlates with the volume above the piston and is therefore low with a large volume in advance of the compression stroke and at the end of the work cycle and is maximal in the region of the smallest volume at top dead center at the end of the compression stroke.

The combustion increase is the difference between the pressure traces which occur with and without combustion. The integral of the combustion increase is a measure for the energy conversion of the combustion. This measure is especially informative for the detection of the combustion misfires. The pressure integral of the buildup phase is suitable for load detection, that is, for detecting the cylinder charge. The position of the maximum is especially interesting for control purposes.

The solution of the task in accordance with the invention comprises that a model becomes effective for the method of the invention and the arrangement of the invention. This model also takes a time or crankshaft angle dependent transfer between pressure and structure-borne noise as a basis also for the relevant low frequency oscillations such as the changing pressure curves and the increases caused by combustion. The time dependency is realized by an angular-dependent transfer function in order to obtain an independency of engine speed.

The invention is based upon the realization that there exists a time dependent and/or crankshaft angle dependent transfer function(s) for the transfer between pressure and structure-borne noise signals. This dependency is explainable to a limited extent by the piston movement during the occurrence of the knock oscillations. The pressure oscillations generated by the knocking, in turn, undergo a frequency modulation because of the movement of the piston.

Only individual components of the reconstructable pressure signal are used for the determination of the combustion-relevant parameters and conditions. For the misfire detection, the reconstruction of the combustion increases in the order range is applied. Here, the term "order" identifies whole number multiples of the ignition frequencies. The ignition frequency of a cylinder of a four-stroke engine lies at half the crankshaft rotational frequency n/2, that is, at the camshaft frequency. For z cylinders, the frequency of the ignitions of the engine correspondingly lies at z*n/2.

The dc component of the combustion increase is represented by the zero Fourier coefficient, for example, for a Fourier transformation of the pressure signal out of the time domain into the frequency domain.

BRIEF DESCRIPTION OF THE DRAWINGS

The invention will now be described with reference to the drawings wherein.

DESCRIPTION OF THE PREFERRED EMBODIMENTS OF THE INVENTION

In an application phase, the transfer function of all internal pressures p(t) to one or more structure-borne noise transducers a(t) is to be first determined once. The time signals p(t) and a(t) are therefore to be viewed as vectorial quantities in the following. It can be assumed that the computed transfer function is valid for piston engines of a production series so that the determination thereof must only be carried out for one of a series.

Figure 1:
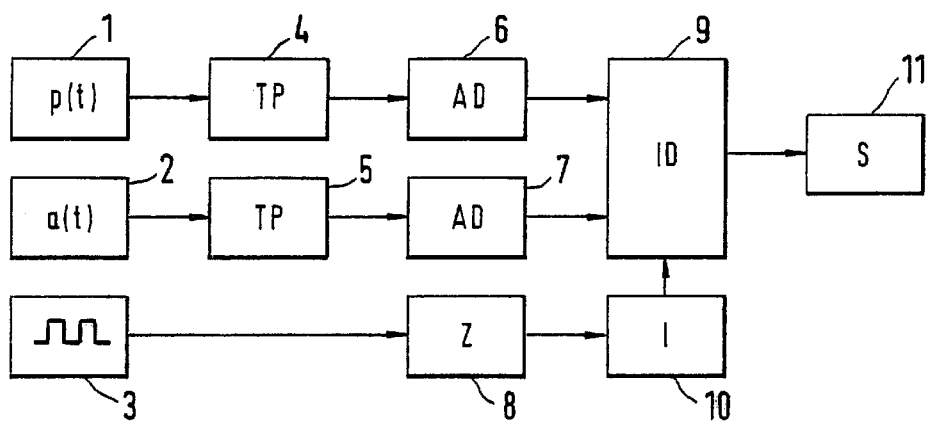
FIG. 1 shows an embodiment of the arrangement for determining the transfer function.

FIG. 1 shows an embodiment of the arrangement for determining the transfer function. The measurement sensor 1 measures all cylinder internal pressure signals p(t) of the piston engine. After analog lowpass filtering with filter 4, the pressure signals are digitalized in means 6 and are ready in this form for further processing. The structure-borne noise signals a(t) are picked up by the measurement sensors 2 and are lowpass filtered with the limit frequency of 4 in 5. To preclude too large disturbances in the structure-borne noise signal, a limit frequency in the order range of, for example, 3 KHz is to be selected. The structure-borne noise signals are likewise digitalized by means of 7. Synchronization pulses are taken up by measurement sensor 3 for synchronization with the piston engine. The number of scanning cycles between the pulses is determined with a counter 8. The interpolation filter 10 then supplies an assigned crankshaft angle value $\alpha$ to each scanning value. The identification unit 9 computes the crankshaft angle dependent pulse answers $h((\alpha,t))$ or the transfer functions $H(\alpha,f)$ (with f proportional to omega) of all transfer paths from the pressure signals to the structure-borne noise signals from the time signals now present in digital form. The computation can take place either in the time domain or in the frequency domain. The dependency of the transfer functions on the rotational speed is considered in the angular dependency of the pulse response or transfer function (block 11).

Figure 2:
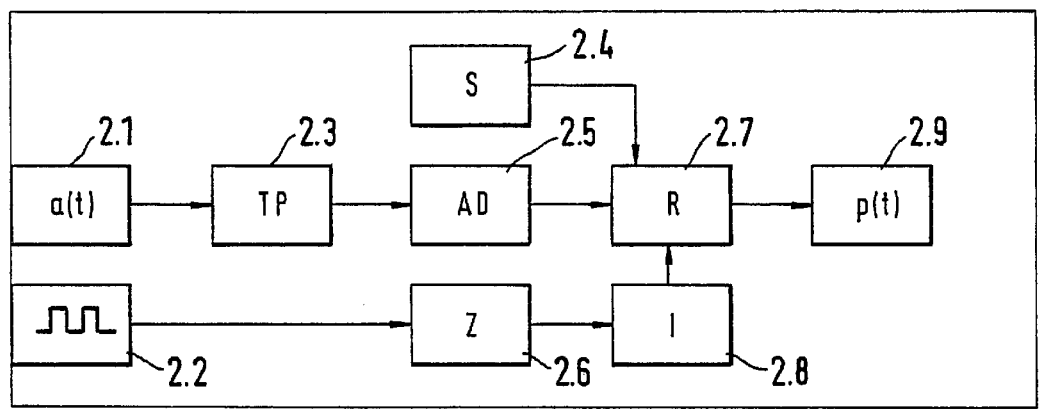
FIG. 2 shows an embodiment of the arrangement for the cylinder-individual computation of the cylinder internal pressure signals p(t) from one or several structure-borne noise signals.

FIG. 2 shows an embodiment of the arrangement for cylinder-individual computation or reconstruction of the cylinder internal pressure signals p(t) from one or several structure-borne noise signals. The internal pressure signals of all cylinders can be completely determined in this way. After taking up the structure-borne noise signals with the measuring sensors 2.1, these signals are lowpass filtered with filter 2.3 and digitalized in the means 2.5. The limit frequency of the lowpass lies in the order range. The number of scanning cycles between the synchronization pulses 2.2 are counted by the counter 2.6 and an assigned crankshaft angle value a is computed for each scanning value by means of the interpolation filter 2.8. Optimal pressure signals 2.9 are determined in the computation unit 2.7 in the sense of the method of least squares which pressure signals could have generated the measured structure-borne noise signals with the pulse responses or transfer functions stored in the memory 2.4.

Figure 3:
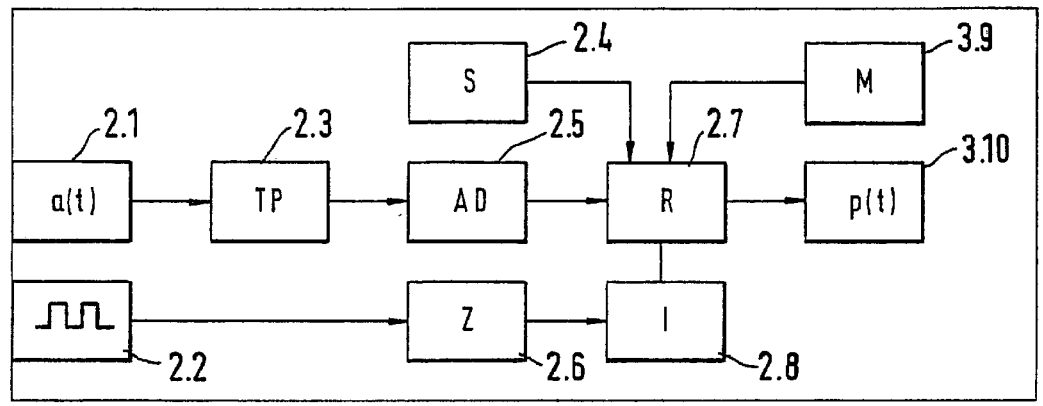
FIG. 3 shows a modified embodiment of the arrangement for the cylinder-individual computation of the cylinder internal pressure signals p(t) from one or several structure-borne noise signals.

FIG. 3 shows a modified embodiment of the arrangement for cylinder-individual computation of the cylinder internal pressure signals p(t) from one or more structure-borne noise signals. The change is defined in the additional means 3.9 which makes available heuristic determined pattern functions. Optimal pressure signals 3.10 are determined in the computation unit 2.7 in the sense of the method of least squares which pressure signals could have generated the measured structure-borne signals with the pulse responses or transfer functions stored in the memory 2.4.

The pressure signals, which are to be computed, are here modeled as linear superpositions of previously heuristically determined pattern functions 3.9. In this way, a stabilization of the method and reduction of the parameters to be computed is achieved.

Figure 4:
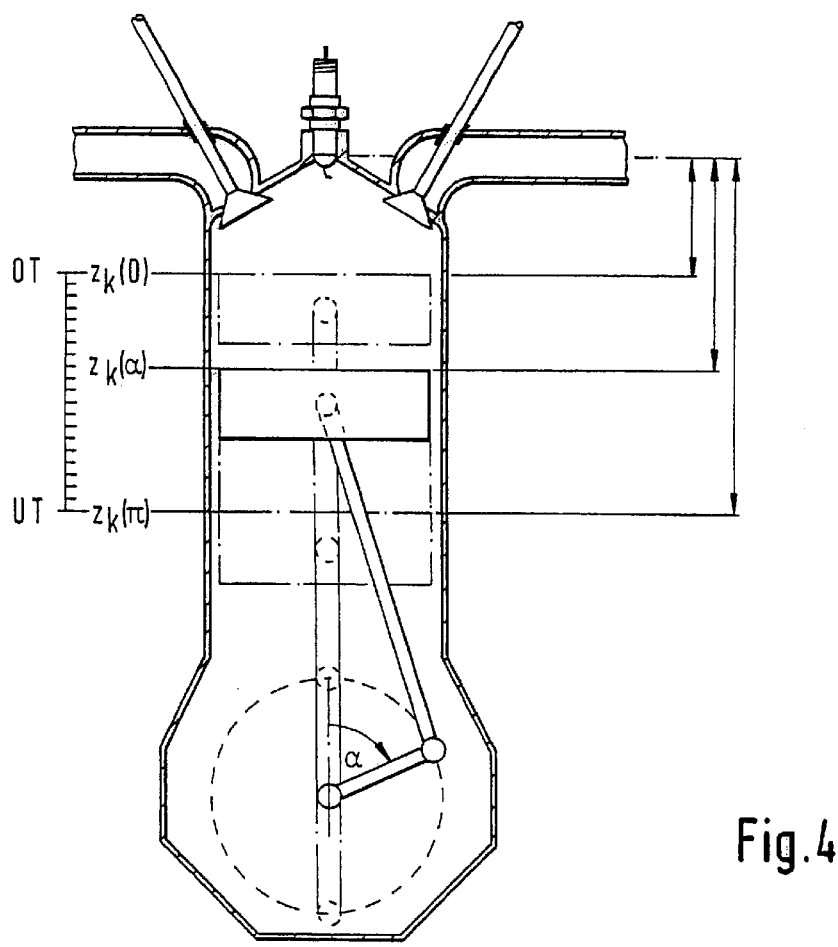
FIG. 4 makes clear the time-dependent or angle-dependent in coupling of the structure-borne noise into the transfer path.

FIG. 4 makes clear the motivation for assuming a time-dependent or angle-dependent transfer function.

During the work cycles, the piston moves cyclically between top dead center and bottom dead center. At top dead center, the surface of the cylinder, which is available for in coupling structure-borne noise, is minimal whereas at bottom dead center it reaches its maximum value. When the piston is located at a time point t at the position $zk(\alpha(t))$ within the cylinder, then the region of the permanent in coupling as well as the cylinder ring of the width $zk(\alpha(t))-zk(0)$ is available as the in-coupling surface. For a further infinitesimal movement of the piston by dz, the in coupling surface increases correspondingly. This effects an additional time-dependency or angle-dependency of the transfer function.

Figure 5:
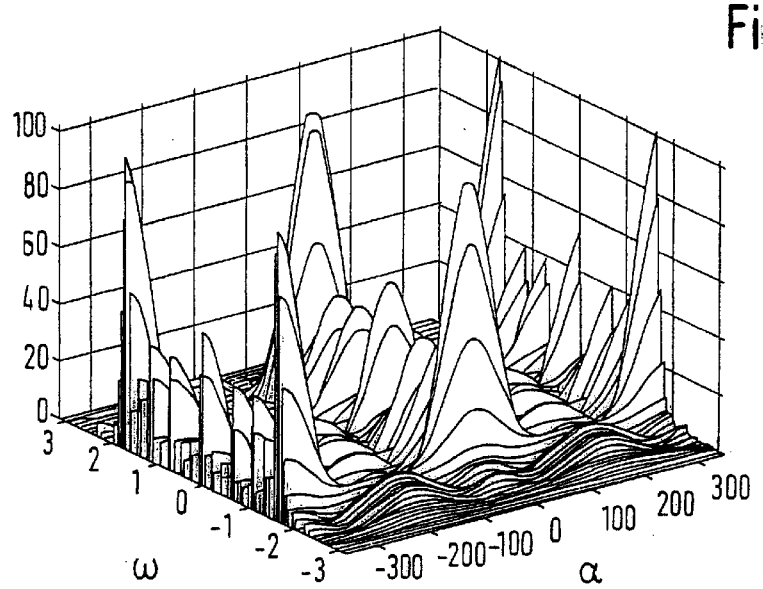
FIG. 5 shows an estimation of the square of the absolute value of the transfer function in its dependency upon the frequency or order omega and on the time and/or the crankshaft angle $\alpha$.

FIG. 5 shows this dependency. FIG. 5 shows an estimate of the square of the absolute value of the transfer function of a specific cylinder to a specific structure-borne sensor. What is here significant, in addition to the frequency selectivity, is the intense time dependency or angle dependency which is considered in accordance with the invention.

What is claimed is:

1. A method for evaluating combustion processes in an internal combustion engine wherein pressure is developed in the cylinders thereof, the method comprising the steps of:

providing a model which becomes effective and which takes a time-dependent transfer between pressure and structure-borne noise as a basis for relevant low-frequency oscillations of said engine;

measuring pressure in said engine and forming a reconstructable pressure signal;

using only individual components of the reconstructable pressure signal for determining combustion-relevant parameters and conditions of said engine; and, achieving independence of engine speed with the realization of the time dependency by means of an angular-dependent transfer function.

2. The method of claim 1, wherein a time-dependent transfer path between pressure and structure-borne noise is identified from an observation of all cylinder pressures and of one or several structure-borne noise signals; and, a structure-borne noise transducer is provided and arranged.

3. The method of claim 1, wherein a set of comparison curves are provided and a non-parametric rule of least squares is applied on the basis of the compression curves and an estimated transfer function for a direct determination of a time trace and/or Fourier coefficients of a combustion increase as a function of crankshaft angle.

4. The method of claim 1, wherein an averaging over pressure signals in drag operation takes place for a determination of a compression curve.

5. The method of claim 1, wherein at least one Fourier coefficient of a combustion increase, which is referred to a crankshaft angle, is applied for a misfire detection.

6. The method of claim 1, wherein a detection of misfires takes place on the basis of an approximate F-test with a guaranteed probability of detection whose false alarm probability is minimal over a signal-to-noise ratio in a class of invariable tests for linear hypotheses.

7. The method of claim 1, wherein a parametric estimate is applied which already operates in an angular range on the basis of a compression curve and an estimated transfer function for a direct determination of Fourier coefficients of a combustion increase referred to the crankshaft angle.

8. An arrangement for evaluating combustion processes in an internal combustion engine, the arrangement comprising:

a model which becomes effective and which takes a time-dependent transfer between pressure and structure-borne noise as a basis for relevant low-frequency oscillations of said engine;

means for measuring pressure in said engine and for forming a reconstructable pressure signal;

means for using only individual components of the reconstructable pressure signal for determining combustion-relevant parameters and conditions; and, means for obtaining independence of engine speed with a realization of the time dependency utilizing an angular-dependent transfer function.

9. The arrangement of claim 8, further comprising: means for averaging over pressure signals in drag operation for determining a compression curve.

10. The arrangement of claim 8, wherein at least one Fourier coefficient of a combustion increase, which is a function of crankshaft angle, is applied for detecting a misfire.

11. The arrangement of claim 8, wherein a detection of misfires takes place on the basis of an approximate F-test with a guaranteed probability of detection whose false alarm probability is minimal over a signal-to-noise ratio in a class of invariable tests for linear hypotheses.

* * * * *